Patented Aug. 16, 1927.

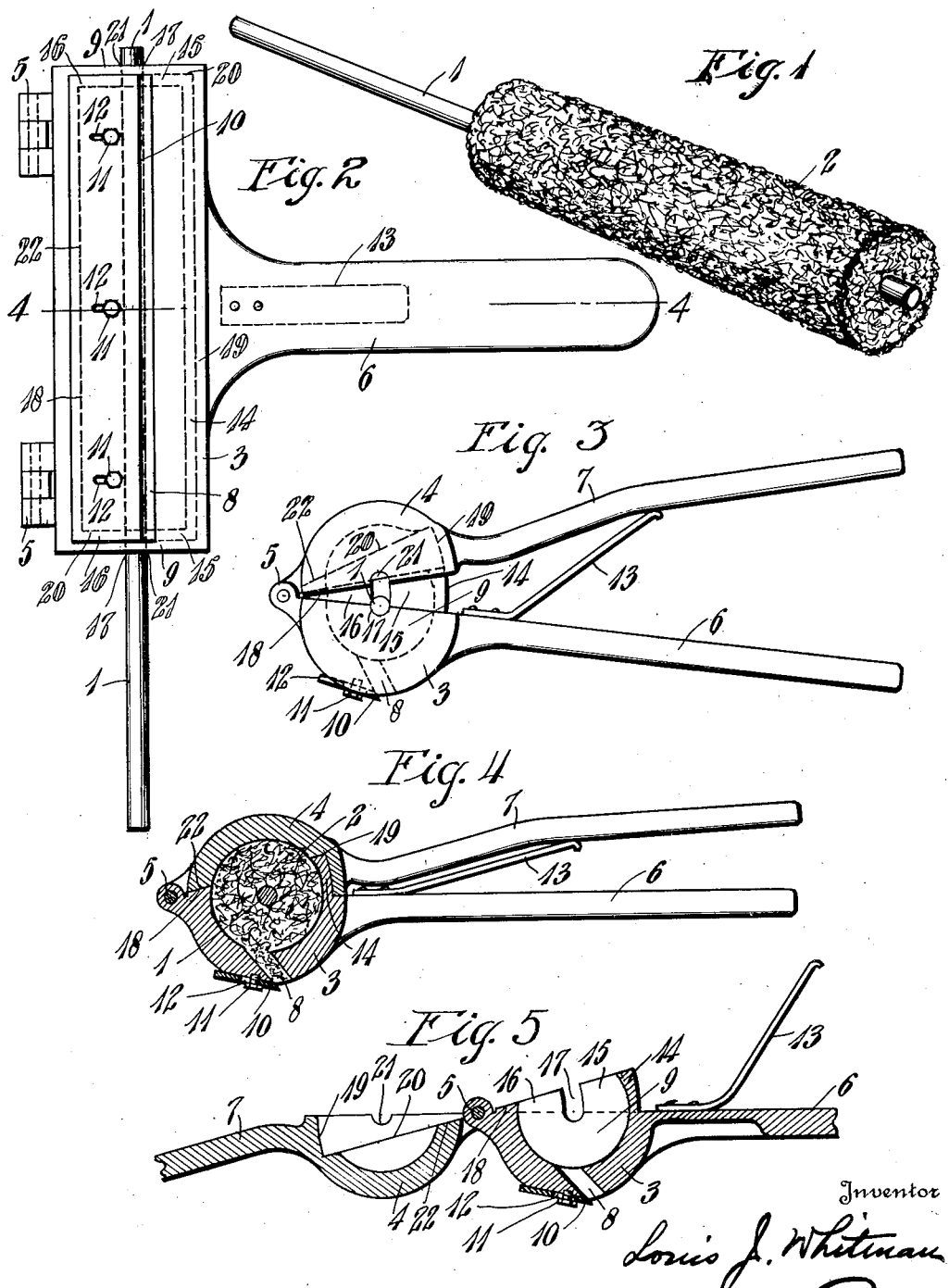

1,639,122

UNITED STATES PATENT OFFICE.

LOUIS J. WHITMAN, OF CINCINNATI, OHIO.

SCRAPER MOLD.

Application filed June 5, 1926. Serial No. 113,958.

My invention relates to confectionery making, and more especially to the making of frozen confections; and its object is to produce a confection of this character, consisting of a body of ice, suitably flavored, surrounding and fast to a stick which serves as a handle in serving, by such method and with such apparatus that there is a saving of expense of apparatus, and of time, labor and material, and increased facility of supplying the confections of the various flavors asked for, with elimination of the necessity of storage of the product and the deterioration and losses thereby involved. Other objects will appear in the course of the ensuing description.

I attain these objects by the method of operation and with the aid of apparatus illustrated, for example, in the accompanying drawing, in which—

Figure 1 is a perspective view of a confection of the kind with which my invention is concerned;

Fig. 2 is a bottom plan view of my scraper mold with one of the sticks, which is to serve as a support and handle for the completed confection, inserted in the mold;

Fig. 3 is a side elevation of the scraper mold in its partly contracted condition in which it is used in scraping, with the stick therein;

Fig. 4 is a longitudinal section on the vertical plane of the line 4—4 of Fig. 2, with the stick and the ice therein, and in its completely contracted condition, completing the confection; and Fig. 5 is a similar section of the scraper mold opened and with the completed confection removed, ready for insertion of another stick, beginning the process of making the next confection.

Confections similar to that shown in Fig. 1 heretofore have been made by inserting the stick 1 centrally in a vessel containing a liquid confection material, including the flavor, and then freezing the liquid in the vessel, after which the stick is withdrawn with the confection 2 frozen thereto. That method requires a rather elaborate refrigerating device in connection with a number of vessels, so that it is not adapted for use at the place of sale of the confections, as well as being a comparatively slow process, requiring considerable skill of the operators and consuming a large part of their time, handling the materials, caring for the freezing operation, and removing the completed confections. It involves the manufacture of the confections in relatively large quantities, at a central plant, the distribution of the confections, upon order of the retailers, and the cold storage by the latter persons, at their risk of loss from souring or melting of the confections; as well as the necessity of the retailer carrying a large stock of the goods in order to have an adequate assortment of flavors.

I eliminate those disadvantages to the retailer, producing an equivalent confection, with the use of the simple apparatus shown in Figs. 2 to 5 inclusive, together with a number of vessels, each containing a quantity of the syrup of the different flavors that will be called for. My method will be better understood after a description of the apparatus.

This apparatus comprises two half-cylindrical mold sections 3 and 4, hinged together at the rear by the hinges 5 alined parallel with the mold axis, and having projecting forwardly from their front rims, midway of their axial lengths, the handles 6 and 7, respectively. The mold section 3, which is the bottom one, has in its bottom, parallel with the mold axis, the slot or throat 8, inclining backward in its upward extent and being of the full length of the mold bottom, from one end wall 9 thereof to the other. Exteriorly of the bottom, to the rear of the throat 8, the thin flat blade 10 is adjustably fixed to the bottom by means of three screws 11 through slots 12 in the blade and threaded up into the bottom of the mold; so that this blade, with its forward edge beveled upward, projects slightly forward of the rear longitudinal edge of the slot or throat 8. The screws 11 preferably have very thin hexagonal heads, so as to present a minimum of obstruction on the bottom of the device, yet be readily grasped when they are to be loosened and tightened, in adjustment of the blade after it has been removed for sharpening.

The handle 6 of this lower section 3 is straight, and next to its junction with the mold section, it has a flat spring 13 riveted to it and extending forwardly and upwardly. The front rim of this lower section 3 has the flange 14 upstanding along its inner edge; and the end walls 9 have upstanding flange portions 15 and 16 between which is a notch 17, in each end wall, the lower end of which is semicircular on the diameter of the mold section, or axis of the mold. These end flange portions slope backward from the junction of the front portion 15 with the respective ends of the front flange 14, on a line from the top edge of the front flange through the axial line of the hinges 5; and they are inset, along the inner edges of the end walls 9. Thus, an externally open rabbet is left all around the ends and front of the upper rim of the lower mold section 3. The rear rim 18 of this lower section projects upward to have its top surface in the plane of inclination of the end flange portions 15 and 16.

The top mold section 4 is cut away internally at 19 along its front rim and at 20 along its end rims; the latter also having semicircular notches 21 in their edges. The rear rim 22 is recessed to match the rear rim 18 of the lower section. The rim of the top section 4 is so proportioned relatively to the flanges 14, 15 and 16 of the bottom section 3 that the flanges enter snugly into the recesses of the upper section when the two sections are swung completely together to form a cylindrical interior cavity; the opposing surfaces being conformed to an arc struck from the pivotal axis of the hinges 5, as regards the front rim portions. The notches 21 of the upper section register with the semicircular bottom ends of the notches 17 of the lower section, to leave small circular openings centrally of the ends of the cavity. The spring 13 engages its upper end against the lower side of the handle 7 of the upper section as the two sections are swung together, so as to hold the two sections in an incompletely swung-together relation as shown in Fig. 3, unless the pressure of this spring further is overcome by an increased squeezing of the handles to completely swing the sections together, with their rim portions telescoping, as in Fig. 4. Preferably, the handle 7 of the upper section is bent somewhat toward the lower handle 6, about midway of its length, so as to avoid complete straightening of the spring at the complete contraction of the device.

In using this device to carry out my method, it is opened, as shown in Fig. 5, allowing one of the sticks 1 to be laid in the lower notches 17, protruding only slightly at one end but with a considerable extension, which is to be the handle of the confection, past the other end, as seen in Fig. 1. The device now is partly contracted by swinging its handles together, with the spring 13 resisting further approach; this being the condition of Fig. 3. The partly contracted device now is used as a scraper, scraping chips or shreds of ice from a cake of ice by means of the blade 10; the separated particles of ice passing up through the throat 8 into the interior of the mold. The spring 13 is strong enough to prevent further closure of the device incident to the normal squeezing pressure of the hand while manipulating the device as a scraper; so that the interior cavity is considerably larger than it ultimately will be, approximately of elliptical cross section, with part of its front wall consisting of the wall of the recess at the front of the interior of the upper section, which front only slightly overlaps the flange 14 of the lower section, and with parts of its end walls formed similarly by the walls of the end recesses, into which the lower section end flange portions 15 and 16 only slightly project. This scraping is continued until sufficient shredded ice has accumulated in the mold to fill it as completely as it may incident to the pressure of incoming ice shreds due to the scraping operation.

At this stage of the operation the shredded ice is rather tightly packed in the mold, and were it merely to be served as a portion of shredded ice, in a dish, for example, the mold might be opened and the portion discharged, as in the use of various scrapers having receptacles for the shredded ice, heretofore known in the art. But at this degree of compactness the ice shreds will not adhere to the stick 1, nor will they freeze to it; hence my provision of the telescoping, partly approached mold sections, and the additional step of the process, which consists in increasing the pressure of the hand on the handles 6 and 7, overcoming the spring 13 further, and completely contracting the device until the interior cavity becomes completely cylindrical. Particles of ice in the recesses left interiorly of the mold due to the incomplete telescoping of the sections will be squeezed out into the body of ice in the mold, and will not obstruct this completion of the contraction; but at the throat 8, there will be negligible escape of ice shreds from the mold because the pressure, during this further contraction, will be indirectly exerted toward the throat through the body of shredded ice. The result is that the ice shreds are firmly packed around the stick 1, where a slight melting of shreds at contact with the stick results in the water permeating the surface fibers of the stick; and then as the body of ice absorbs the heat of the stick and of this permeated water, the latter again freezes, in and about the stick material, as firmly held thereto in the tightly packed mass of ice shreds. After this increased compacting pressure has been maintained for a few seconds, the device may be swung open again to the condition of Fig. 5, allowing the stick 1 to be lifted from the notches 17 with the ice body 2 firmly adhering thereto, in the condition shown in Fig. 1. That portion of ice in the throat 8, not having been compacted with the main body 2, will readily break away as the body 2 is withdrawn from the mold. Holding the article by the stick 1, the body 2 is immersed in the syrup of the flavor desired for a few seconds. The compacting of the ice shreds has not been to such degree that the syrup will not penetrate the body 2 readily; and this step of the operation results in the body 2 being impregnated with the flavoring syrup throughout, and it now is ready to serve; being held by the stick 1 while the flavored confection 2 is eaten.

Merely by possession of the simple implement described, the retailer may make these confections as called for, of the flavor asked for; and he is not obliged to keep a stock of the confections in a large assortment of flavors, at risk of loss, either from deterioration or from a demand for certain flavors less than was anticipated. This results in a wider distribution among the smaller dealers, concessionaires, street vendors, and the like, who could not afford to carry the stocks required by the methods heretofore attending manufacture and sale of such articles, as hereinbefore outlined. The article may be handled at a larger profit to the dealer, or lower cost to the consumer, or both, than heretofore; and the consumer also benefits by the wider distribution, and the assurance of freshly prepared product.

Modifications may occur, in the method of preparation or in the apparatus, and while my description is rather specific, as is required to fully disclose the preferred example of my invention, I do not wish to be understood as being limited to the precise details disclosed, but what I claim as new and desire to secure by Letters Patent is:

1. A scraper-mold having a mold cavity with an inlet for a confection handle and an inlet for confection material, a scraper on said mold, discharging into the second mentioned inlet, and means whereby said cavity may be constricted.

2. A scraper-mold comprising a plurality of mold sections, means yieldingly holding said sections incompletely approached to each other, means to form an enclosed mold cavity between said sections upon incomplete approach of said sections to each other, said means permitting complete approach to each other, to constrict said cavity, said mold having an inlet, and scraping means on said mold, discharging into said inlet.

3. A scraper-mold comprising a plurality of mold sections, means along the mutually facing surfaces of said sections to form an enclosed mold cavity between said sections upon incomplete approach of said sections to each other, said means permitting complete approach of said sections to each other and said means and said surfaces having, upon said complete approach, an opening to admit a confection handle to said cavity, said mold having an inlet for confection material, and a scraper on said mold, discharging into said inlet.

4. A scraper mold comprising mold-sections having at least one pair of registering notches in their mutually facing edges, said mold having an inlet for confection material, and a scraper on said mold, discharging into said inlet.

5. In combination, a pair of telescoping mold sections having at least one pair of registering notches in their mutually facing edges, to admit a confection handle, said mold having an inlet for confection material, and disintegrating means on said mold, discharging into said inlet.

6. In combination, a pair of telescoping mold sections having at least one pair of registering notches in their mutually facing edges, a hinge connecting said sections at one side thereof, handles on the respective sections at the opposite side thereof, said mold having an inlet, and disintegrating means on said mold, discharging into said inlet.

7. In combination, a pair of telescoping mold sections, having at least one pair of registering notches in their mutually facing edges, a hinge connecting said sections at one side thereof, handles on the respective sections at the opposite side thereof, a spring between said handles, holding said handles apart, said mold having an inlet, and disintegrating means on said mold, discharging into said inlet.

LOUIS J. WHITMAN.